United States Patent

Song

[11] Patent Number: 5,909,263
[45] Date of Patent: Jun. 1, 1999

[54] LIQUID CRYSTAL DISPLAY PANEL ARRAY STRUCTURE AT A PIXEL CONTACT HOLE

[75] Inventor: Young-Goo Song, Seoul, Rep. of Korea

[73] Assignee: Samsung Electronics Co., Ltd., Suwon, Rep. of Korea

[21] Appl. No.: 08/964,138

[22] Filed: Nov. 6, 1997

[51] Int. Cl.[6] .................................................. G02F 1/136
[52] U.S. Cl. ................................ 349/43; 257/59; 257/347
[58] Field of Search ................................... 349/43; 257/59, 257/347

[56] References Cited

U.S. PATENT DOCUMENTS 5,668,379  9/1997  Ono et al. ................................. 257/59

Primary Examiner—William L. Sikes
Assistant Examiner—Robert J. Hollingshead
Attorney, Agent, or Firm—Myers Bigel Sibley & Sajovec

[57] ABSTRACT

An array structure for preventing an open ITO defect includes an amorphous silicon layer, and a high-doped amorphous silicon layer formed above the amorphous silicon layer, and a drain electrode formed above the doped amorphous silicon layer, completely enclosing the amorphous silicon layer and the doped amorphous silicon layer.

20 Claims, 3 Drawing Sheets

LIQUID CRYSTAL DISPLAY PANEL ARRAY STRUCTURE AT A PIXEL CONTACT HOLE

FIELD OF THE INVENTION

This invention relates to liquid crystal displays, and more particularly to drain electrode structures for liquid crystal displays.

BACKGROUND OF THE INVENTION

Liquid crystal displays (LCDs) are widely used flat panel display devices. As is well known to those having skill in the art, an LCD generally includes two spaced apart substrates with liquid crystals therebetween. A plurality of spaced apart gate lines are formed on a substrate, and a plurality of spaced apart data lines are formed on the substrate that intersect the plurality of spaced apart gate lines. Accordingly, the gate lines and data lines define an array of pixels. An array of pixel electrodes is provided, a respective one of which is in a respective one of the pixels. An array of thin film transistors is also provided, each comprising a gate electrode that is connected to one of the spaced apart gate lines, a gate insulator on the gate electrode, and an amorphous silicon layer on the gate insulator. Spaced apart source and drain electrodes are provided on the amorphous silicon layer. The source electrode is connected to one of the spaced apart data lines. The drain electrode overlaps a pixel electrode, and is electrically connected thereto through a contact hole therebetween.

FIG. 1 is a schematic diagram of a pixel of a conventional LCD. It will be understood that these pixels replicate in an array to form an LCD. As shown, a plurality of spaced apart gate lines 30 and a plurality of spaced apart data lines 40 are formed on a substrate and define an array of pixels. A pixel electrode 160, for example an indium tin oxide electrode, is included in a pixel. As shown in FIG. 1, the pixel electrode 160 may also partially overlap a gate line 30. A thin film transistor (TFT) 20 is located at the upper right corner of the pixel below the pixel to which it is connected. However, other positions may be used.

The TFT 20 includes a drain electrode which is connected to the pixel electrode 160, a gate electrode 142 which is connected to the gate line 30 and source electrode 144 which is connected to the data line 40. The pixel electrode 160 and the drain electrode 140 are generally formed in different layers of the LCD and are separated from each other by a passivation layer. The drain electrode 140 overlaps the pixel electrode 160 and is electrically connected thereto through a contact hole 10 therebetween in the passivation layer. As is well known, the contact hole 10 may be formed by etching the passivation layer to expose a portion of the drain electrode 140.

An LCD displays desired images by controlling the brightness of each pixel. The brightness of a pixel is controlled by the gate line 30, the data line 40, the TFT 20 and the pixel electrode 160. In general, a data signal is first sent through the data line 40, and a gate signal is sent to the selected gate line 30. The gate electrode 142 of the TFT 20 receives the gate signal and turns on the TFT 20 so that the data signal can pass from the source electrode 144 to the drain electrode 140, through an amorphous silicon layer 120, and then to the pixel electrode 160. Upon receiving the data signal, the pixel electrode 160 controls the amount of light passing through the pixel based on the data signal received, thereby controlling the brightness of the pixel.

FIG. 2 is an enlarged view of FIG. 1 at the pixel contact hole 10. Outlines of the amorphous silicon layer 120, the drain electrode 140, and the pixel electrode 160 are shown in FIG. 2.

FIG. 3 is a cross-sectional view of FIG. 2 taken along the section line III–III'. A gate insulator 110 is provided on an LCD substrate such as a glass substrate 100. The amorphous silicon layer 120 is provided on the gate insulator 110 extending from adjacent the pixel contact hole 10 to the TFT 20.

A doped amorphous silicon layer 130, generally doped with donor impurities and referred to as n+a-Si, is provided on the amorphous silicon layer 120. Its edges extend short of an edge of the amorphous silicon layer 120 near the pixel hole contact and creates a first conventional profile section 170 shown in FIG. 3.

The drain electrode 140 is located on the doped amorphous silicon layer 130. An edge of the drain electrode also extends short of an edge of the amorphous silicon layer 120 near the pixel hole contact 10. The drain electrode 140 partially covers the doped amorphous silicon layer 130. However, at least one of its edges is aligned with an edge of the doped amorphous silicon layer 130 and creates the first conventional profile section 170 on the amorphous silicon layer 130. The first conventional profile section 170 may be created by an etching process that etches portions of the doped amorphous silicon layer 130 that are not covered by the drain electrode 140.

In addition to the doped amorphous silicon layer 130 and the drain electrode 140, a portion of the amorphous silicon layer 120 also contributes to the first conventional profile section 170. In particular, a portion of the amorphous silicon layer 120 may be inadvertently etched in the etching process, since the amorphous silicon layer 120 has similar etching properties to the doped amorphous silicon layer 130. Therefore, the first conventional profile section 170 is relatively high, and has a steep slope, since the heights of the drain electrode 140, the doped amorphous silicon 130 and the etched out portion of the amorphous silicon layer 120 all contribute to the profile section.

As shown in FIG. 3, the first conventional profile section 170 exists on the amorphous silicon layer 120 where edges of the drain electrode 140 extend short of edges of the amorphous silicon layer 120. Thus, the pixel contact hole 10 is almost complete surrounded by the first conventional profile section 170.

Returning to the description of the array structure, a passivation layer 150 completely covers the drain electrode 140 and the first conventional profile section 170. A portion of the passivation layer 150 is removed to form the pixel contact hole 10. The pixel electrode 160 is then formed on the passivation layer, contacting the drain electrode 140 through the pixel contact hole 10. The pixel electrode 160 receives the data signal for appropriately aligning liquid crystals in a pixel to display images, through the pixel contact hole 10 and via the drain electrode.

As can be seen in FIGS. 2 and 3, the pixel electrode 160 extends the furthest adjacent the pixel contact hole 10, compared to the amorphous silicon layer 120, the doped amorphous silicon layer 130, and the drain electrode 140. The pixel electrode 160 covers the portion of the passivation layer 150 on the first conventional profile section 170. Thus, the pixel electrode 160 also has a second conventional profile section 180 which has relatively large step height due to the height of the first conventional profile section 170.

As a result, an open pixel electrode may occur on the second conventional profile section 180 during pixel electrode patterning due to its height and the steep slope. The open pixel electrode produces a defect that may prevent proper processing of the data signal by the pixel electrode 160, which can result in poor display quality.

SUMMARY OF THE INVENTION

It is therefore an object of the present invention to provide improved drain structures for liquid crystal display (LCD) panels.

It is another object of the present invention to provide drain structures for LCDs that can reduce defects in pixel electrodes adjacent thereto.

These and other objects are provided, according to the present invention, by an extended drain electrode adjacent a pixel contact hole, wherein the extended drain electrode completely covers the amorphous silicon layer between the amorphous silicon layer and the pixel electrode. By providing an extended drain electrode, a reduced profile section in the drain electrode and amorphous silicon layer may be provided, and a reduced step height of the pixel electrode adjacent the pixel contact hole may be provided. Improved reliability of LCD panels may therefore be provided.

In particular, drain structures for LCD displays according to the invention include an LCD substrate, a gate insulator on the LCD substrate, an (undoped) amorphous silicon layer on the gate insulator, and a drain electrode on the amorphous silicon layer. A pixel electrode is provided on the drain electrode and extending beyond the drain electrode. The drain electrode completely covers the amorphous silicon layer between the amorphous silicon layer and the pixel electrode. A source electrode is also provided on the amorphous silicon layer and spaced apart from the drain electrode.

Preferably, a doped amorphous silicon layer is also provided between the drain electrode and the amorphous silicon layer. The drain electrode completely covers the doped amorphous silicon layer between the amorphous silicon layer and the pixel electrode. A passivation layer may also be provided on the drain electrode. The passivation layer includes therein a contact hole that exposes the drain electrode. The pixel electrode is provided on the passivation layer opposite the drain electrode and electrically contacts the drain electrode through the contact hole. Also preferably, the drain electrode completely covers and extends beyond the amorphous silicon layer beneath the pixel electrode.

According to another aspect of the invention, drain structures for LCDs include an LCD substrate and a gate insulator on the LCD substrate. An amorphous silicon layer is provided on the gate insulator. The amorphous silicon layer includes a lateral face and at least one wall that extends from the lateral face to the gate insulator. A drain electrode is provided on the amorphous silicon layer. A pixel electrode is provided on the drain electrode, extending beyond the drain electrode. The drain electrode completely covers the lateral face of the amorphous silicon layer between the amorphous silicon layer and the pixel electrode. Preferably, the drain electrode further completely covers the at least one wall of the amorphous silicon layer, between the amorphous silicon layer and the pixel electrode. Most preferably, the drain electrode extends beyond the at least one wall of the amorphous silicon layer, beneath the pixel electrode.

Drain structures according to the present invention may be integrated into a liquid crystal display that includes an LCD substrate, a plurality of spaced apart gate lines on the LCD substrate, a plurality of spaced apart data lines on the LCD substrate that intersect the plurality of spaced apart gate lines to define an array of pixels and an array of pixel electrodes, a respective one of which is in a respective one of the pixels. An array of thin film transistors is also provided. Each thin film transistor includes a gate electrode that is connected to one of the spaced apart gate lines, a gate insulator on the gate electrode, an amorphous silicon layer on the gate insulator, and spaced apart source and drain electrodes on the amorphous silicon layer. The source electrode is electrically connected to one of the spaced apart data lines. The drain electrode overlaps the pixel electrode and is electrically connected thereto through a contact hole therebetween. The drain electrode completely covers the amorphous silicon layer adjacent the contact hole.

According to another aspect of the present invention, drain structures may be integrated into an LCD that includes an LCD substrate, gate lines, data lines, pixel electrodes and thin film transistors as described above, wherein the amorphous silicon layer includes a lateral face and at least one wall that extends from the lateral face to the gate insulator. The drain electrode completely covers the lateral face of the amorphous silicon layer adjacent the contact hole, so that none of the lateral face of the amorphous silicon layer is exposed adjacent the contact hole. Preferably, the drain electrode also completely covers the at least one wall of the amorphous silicon layer adjacent the contact hole. Most preferably, the drain electrode also extends around the at least one wall of the amorphous silicon layer, beneath the pixel electrode. Accordingly, reduced step heights in the pixel electrode may be provided, thereby improving the reliability thereof.

DETAILED DESCRIPTION OF PREFERRED EMBODIMENTS

Figure 1:
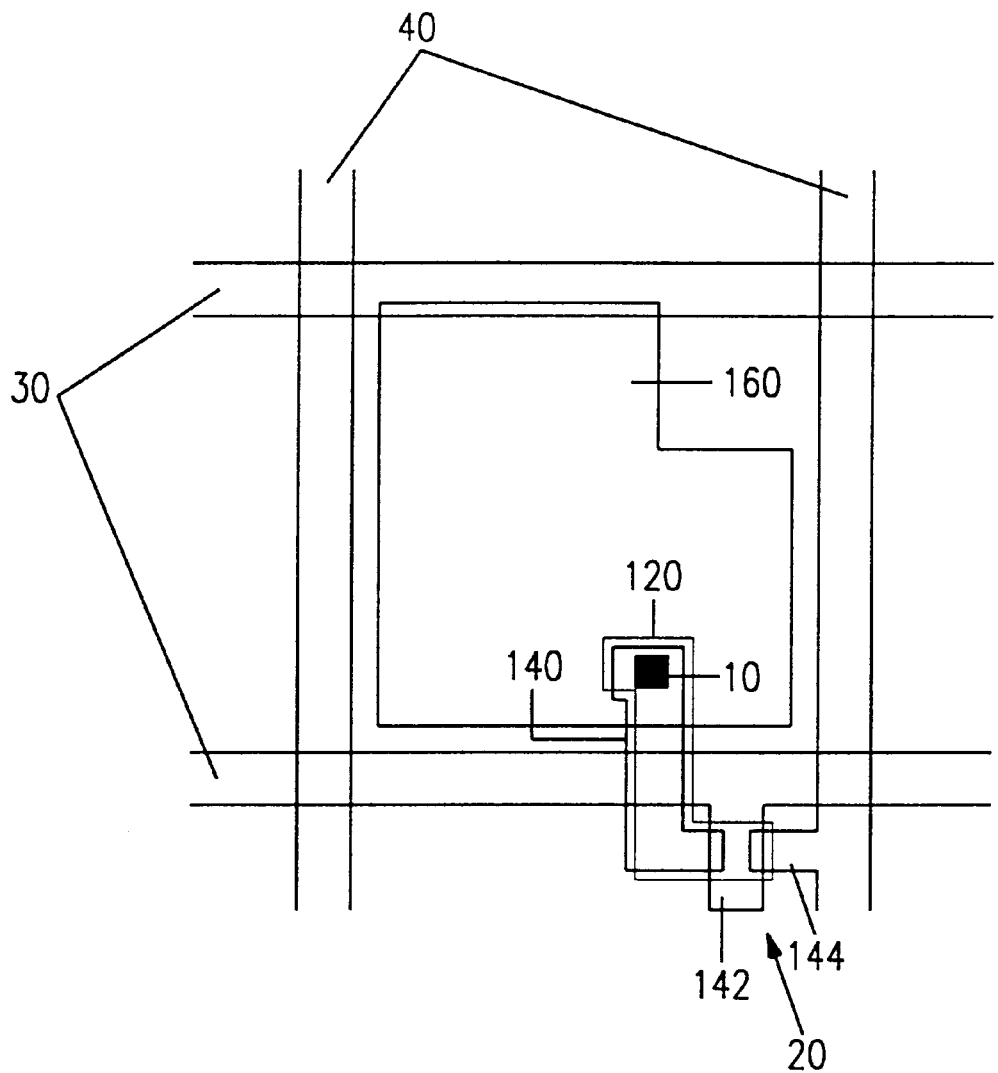
FIG. 1 is a schematic diagram of a conventional LCD.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, the thickness of layers and regions are exaggerated for clarity. Like numbers refer to like elements throughout. It will be understood that when an element such as a layer, region or substrate is referred to as being "on" another element, it can be directly on the other element or intervening elements may also be present. Similarly, when an element is referred to as "covering" another element, it can directly cover the other element or intervening elements may also be present.

Figure 4:
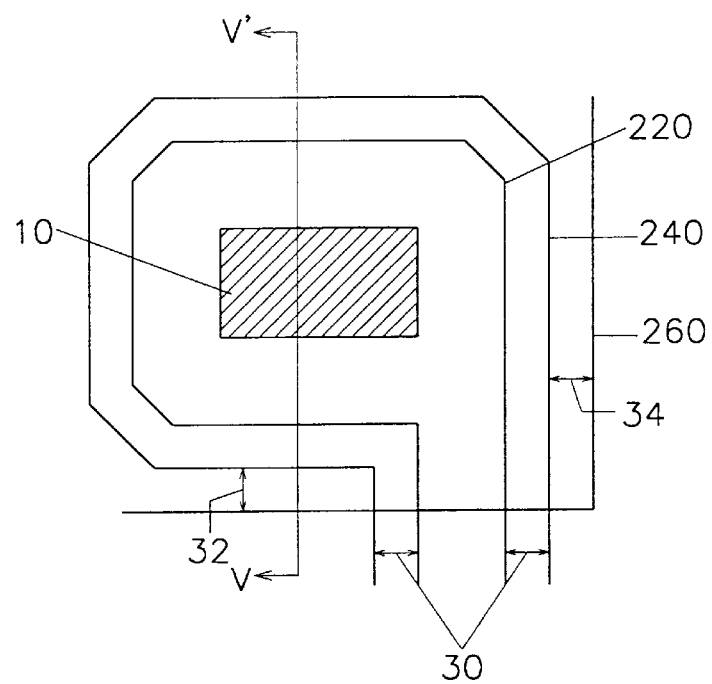
FIG. 4 illustrates a drain structure adjacent a pixel contact hole according to the present invention.

Referring now to FIG. 4, an enlarged view of drain structures for LCDs according to the invention is shown. As shown in FIG. 4, the drain structure includes an amorphous silicon layer 220, a drain electrode 240 and a pixel electrode, such as an ITO electrode 260. A pixel contact hole 10 is also shown.

Figure 5:
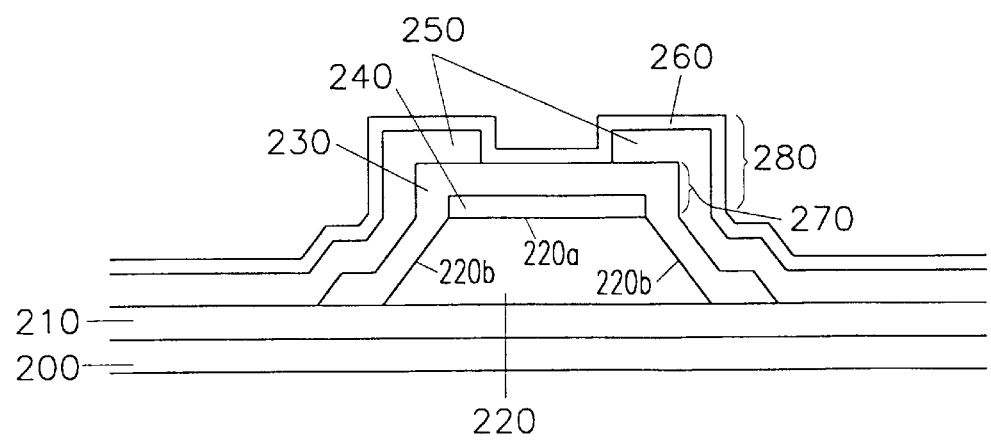
FIG. 5 is a cross-sectional view of FIG. 4.

FIG. 5 is a cross-sectional view of FIG. 4 taken along the line V–V'. As shown in FIG. 5, a gate insulator 210 is provided on an LCD substrate, such as a glass substrate 200. An amorphous silicon layer 220 is provided on the gate insulator 210. The amorphous silicon layer 220 extends from a layer near the pixel contact hole 10 to a thin film transistor, such as was shown in FIG. 1. The amorphous silicon layer 220 includes a lateral (top) face 220a and at least one wall 220b that extends from the lateral face 220a to the gate insulator 210. As shown, the wall 220b may be oblique, or it may extend perpendicular to the lateral face 220a.

Still referring to FIG. 5, a doped amorphous silicon layer 230 is formed on the lateral face 220a of the amorphous silicon layer 220. A drain electrode 240 is provided on the amorphous silicon layer 220. As shown in FIGS. 4 and 5, the drain electrode 240 completely covers the lateral face 220a of the amorphous silicon layer 220 adjacent the contact hole 10, so that none of the lateral face of the amorphous silicon layer is exposed adjacent the contact hole. As also shown, the drain electrode 240 also preferably completely covers the at least one wall 220b of the amorphous silicon layer 220 adjacent the contact hole 10, between the amorphous silicon layer and the pixel electrode. Finally, as also shown in FIGS. 4 and 5, the drain electrode 240 extends beyond the at least one wall 220b of the amorphous silicon layer 220 beneath the pixel electrode 260.

Thus, referring to FIG. 4, it may be seen that adjacent the contact hole 10, the drain electrode 240 extends beyond the amorphous silicon layer 220 and forms a guard band 30 around the amorphous silicon layer 220.

Referring again to FIG. 5, a passivation layer 250 is provided on the drain electrode 240. A portion of the passivation layer 250 is etched or otherwise absent, to expose the drain electrode 240, and thereby form the pixel contact hole 10. The pixel electrode 260 is provided on the passivation layer, opposite the drain electrode, and electrically contacts the drain electrode through the pixel contact hole 10.

Figure 2:
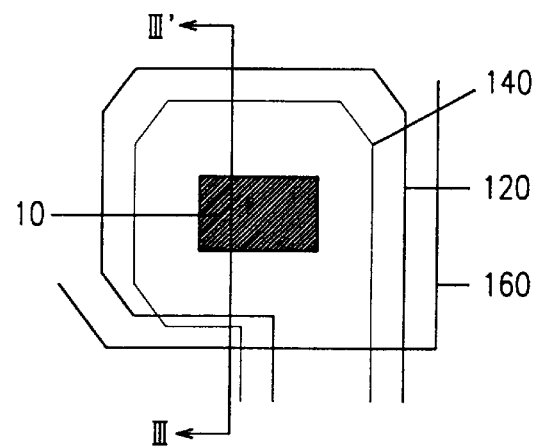
FIG. 2 is an enlarged view of an LCD structure adjacent a pixel contact hole.

Accordingly, the doped amorphous silicon layer 230 entirely covers the lateral face 220a of the amorphous silicon layer 220. In contrast, as shown in FIGS. 1–3, a conventional doped amorphous silicon layer 130 does not cover a portion of the lateral (top) face of the amorphous silicon layer 120.

Moreover, the drain electrode 240 of LCD panels according to the invention entirely encloses both the doped amorphous silicon layer 230 and the amorphous silicon layer 220 adjacent the pixel contact hole 10. In contrast, referring to FIGS. 1–3, the drain electrode 130 of a conventional LCD only encloses a small portion of the doped amorphous silicon layer 130 and of the amorphous silicon layer 120 adjacent the pixel contact hole 10.

Figure 3:
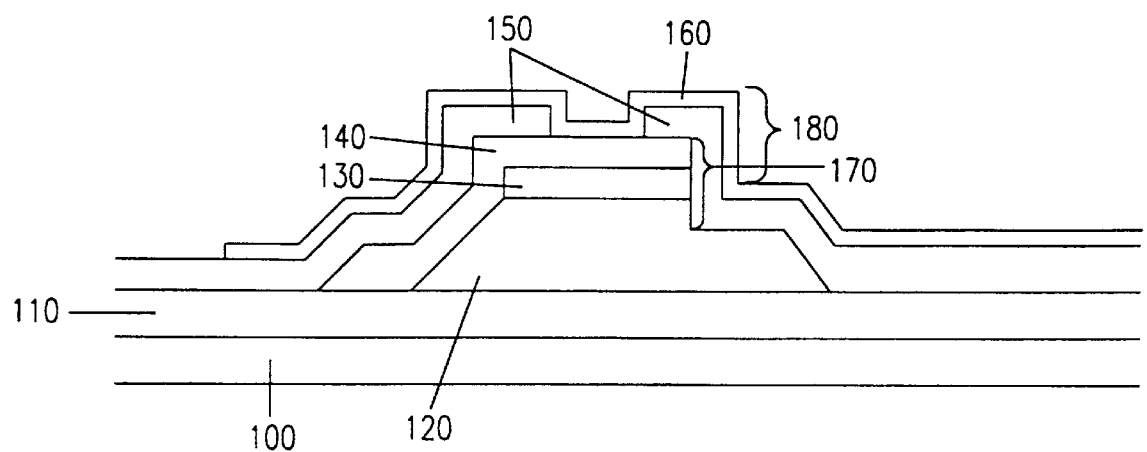
FIG. 3 is a cross-sectional view of FIG. 2.

As a result, the height of a first profile section 270 of FIG. 5 may be reduced considerably compared to the conventional first profile section 170 of FIG. 3, since the contributions to the first profile section height by the doped amorphous silicon layer 230 and the drain electrode 240 are reduced. The height of the first profile section 270 may be further reduced. In particular, there may be no accidental etching of the amorphous silicon layer 220 according to the present invention since the drain electrode 240 fully covers the amorphous silicon layer 220. Consequently, the height of a second profile section 280 may be considerably less than that of the second conventional profile section 180 as well, thus allowing reduction and preferably preventing an open pixel electrode defect thereon. In order to minimize the heights of the first and the second profile sections 270 and 280, the drain electrode 240 preferably extends as far as possible from the amorphous silicon layer 220.

Referring to FIG. 4, the drain electrode 240 is preferably fabricated so that all of its edges extend beyond edges of the amorphous silicon layer 220 adjacent the contact hole 10 to define a first safety space or guard band 30. The first guard band 30 may be at least 1.5 μm wide in order to take into account the possibility of misalignment in the photolithography process. Similarly, the pixel electrode 260 should preferably be formed so that its edges extend beyond the edges of the drain electrode 240 adjacent the contact hole 10 to define a second safety space or guard band 32 and a third safety space or guard band 34 which are preferably at least 1.5 μm wise.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A drain structure for a liquid crystal display (LCD) comprising:
    an LCD substrate;
    a gate insulator on the LCD substrate;
    an amorphous silicon layer on the gate insulator;
    a drain electrode on the amorphous silicon layer; and
    a pixel electrode on the drain electrode and extending beyond the drain electrode, wherein the drain electrode completely covers the amorphous silicon layer between the amorphous silicon layer and the pixel electrode.

2. A drain structure according to claim 1 further comprising:
    a source electrode on the amorphous silicon layer and spaced apart from the drain electrode.

3. A drain structure according to claim 1 further comprising a doped amorphous silicon layer between the drain electrode and the amorphous silicon layer, the drain electrode completely covering the doped amorphous silicon layer between the amorphous silicon layer and the pixel electrode.

4. A drain structure according to claim 1 further comprising:
    a passivation layer on the drain electrode, including therein a contact hole that exposes the drain electrode;
    wherein the pixel electrode is on the passivation layer opposite the drain electrode, and electrically contacts the drain electrode through the contact hole.

5. A drain structure according to claim 1 wherein the drain electrode completely covers and extends beyond the amorphous silicon layer beneath the pixel electrode.

6. A drain structure for a liquid crystal display (LCD) comprising:
    an LCD substrate;
    a gate insulator on the LCD substrate;
    an amorphous silicon layer on the gate insulator, the amorphous silicon layer including a lateral face and at least one wall that extends from the lateral face to the gate insulator;
    a drain electrode on the amorphous silicon layer; and
    a pixel electrode on the drain electrode and extending beyond the drain electrode, wherein the drain electrode completely covers the lateral face of the amorphous silicon layer between the amorphous silicon layer and the pixel electrode.

7. A drain structure according to claim 6 further comprising:
    a source electrode on the amorphous silicon layer and spaced apart from the drain electrode.

8. A drain structure according to claim 6 further comprising a doped amorphous silicon layer on the lateral face of the amorphous silicon layer, the drain electrode completely covering the doped amorphous silicon layer between the amorphous silicon layer and the pixel electrode.

9. A drain structure according to claim 6 further comprising:
- a passivation layer on the drain electrode, including therein a contact hole that exposes the drain electrode;
- wherein the pixel electrode is on the passivation layer opposite the drain electrode, and electrically contacts the drain electrode through the contact hole.

10. A drain structure according to claim 6 wherein the drain electrode further completely covers the at least one wall of the amorphous silicon layer between the amorphous silicon layer and the pixel electrode.

11. A drain structure according to claim 10 wherein the drain electrode extends beyond the at least one wall of the amorphous silicon layer, beneath the pixel electrode.

12. A liquid crystal display (LCD) comprising:
- an LCD substrate;
- a plurality of spaced apart gate lines on the LCD substrate;
- a plurality of spaced apart data lines on the LCD substrate that intersect the plurality of spaced apart gate lines to define an array of pixels;
- an array of pixel electrodes, a respective one of which is in a respective one of the pixels; and
- an array of thin film transistors, each comprising a gate electrode that is connected to one of the spaced apart gate lines, a gate insulator on the gate electrode, an amorphous silicon layer on the gate insulator, and spaced apart source and drain electrodes on the amorphous silicon layer, the source electrode being connected to one of the spaced apart data lines, the drain electrode overlapping a pixel electrode and being electrically connected thereto through a contact hole therebetween;
- wherein the drain electrode completely covers the amorphous silicon layer adjacent the contact hole.

13. An LCD according to claim 12 further comprising a doped amorphous silicon layer between the drain electrode and the amorphous silicon layer adjacent the contact hole, the drain electrode completely covering the doped amorphous silicon layer adjacent the contact hole.

14. An LCD according to claim 12 further comprising:
- a passivation layer on the drain electrode, including therein the contact hole;
- wherein the pixel electrode is on the passivation layer opposite the drain electrode, and electrically contacts the drain electrode through the contact hole.

15. A drain structure according to claim 12 wherein the drain electrode completely covers and extends beyond the amorphous silicon layer beneath the pixel electrode.

16. A liquid crystal display (LCD) comprising:
- an LCD substrate;
- a plurality of spaced apart gate lines on the LCD substrate;
- a plurality of spaced apart data lines on the LCD substrate that intersect the plurality of spaced apart gate lines to define an array of pixels;
- an array of pixel electrodes, a respective one of which is in a respective one of the pixels; and
- an array of thin film transistors, each comprising a gate electrode that is connected to one of the spaced apart gate lines, a gate insulator on the gate electrode, an amorphous silicon layer on the gate insulator, the amorphous silicon layer including a lateral face and at least one wall that extends from the lateral face to the gate insulator, and spaced apart source and drain electrodes on the amorphous silicon layer, the source electrode being connected to one of the spaced apart data lines, the drain electrode overlapping a pixel electrode and being electrically connected thereto through a contact hole therebetween;
- wherein the drain electrode completely covers the lateral face of the amorphous silicon layer adjacent the contact hole so that none of the lateral face of the amorphous silicon layer is exposed adjacent the contact hole.

17. An LCD according to claim 16 further comprising a doped amorphous silicon layer on the lateral face of the amorphous silicon layer, the drain electrode completely covering the doped amorphous silicon layer between the amorphous silicon layer and the pixel electrode adjacent the contact hole.

18. An LCD according to claim 16 further comprising:
- a passivation layer on the drain electrode, including therein the contact hole;
- wherein the pixel electrode is on the passivation layer opposite the drain electrode, and electrically contacts the drain electrode through the contact hole.

19. An LCD according to claim 16 wherein the drain electrode further completely covers the at least one wall of the amorphous silicon layer adjacent the contact hole, between the amorphous silicon layer and the pixel electrode.

20. A drain structure according to claim 16 wherein the drain electrode extends beyond the at least one wall of the amorphous silicon layer, beneath the pixel electrode.

* * * * *

UNITED STATES PATENT AND TRADEMARK OFFICE
CERTIFICATE OF CORRECTION

PATENT NO.    : 5,909,263
DATED         : June 1, 1999
INVENTOR(S)   : Young-Goo Song It is certified that error appears in the above-identified patent and that said Letters Patent is hereby corrected as shown below:

The Substitute Abstract, as provided in the Amendment transmitted to the U.S. Patent and Trademark Office on July 16, 1999, was not printed in the Original Letters Patent. Please include the following Substitute Abstract:

"Drain structures for liquid crystal displays (LCDs) include an LCD substrate, a gate insulator on the LCD substrate, an (undoped) amorphous silicon layer on the gate insulator, and a drain electrode on the amorphous silicon layer. A pixel electrode is provided on the drain electrode and extending beyond the drain electrode. The drain electrode completely covers the amorphous silicon layer between the amorphous silicon layer and the pixel electrode. A source electrode is also provided on the amorphous silicon layer and spaced apart from the drain electrode. Preferably, a doped amorphous silicon layer is also provided between the drain electrode and the amorphous silicon layer. The drain electrode completely covers the doped amorphous silicon layer between the amorphous silicon layer and the pixel electrode. A passivation layer may also be provided on the drain electrode. The passivation layer includes therein a contact hole that exposes the drain electrode. The pixel electrode is provided on the passivation layer opposite the drain electrode and electrically contacts the drain electrode through the contact hole. Also preferably, the drain electrode completely covers and extends beyond the amorphous silicon layer beneath the pixel electrode."

Signed and Sealed this

Sixteenth Day of November, 1999

Attest:

Q. TODD DICKINSON

*Attesting Officer*    *Acting Commissioner of Patents and Trademarks*